United States Patent [19]

Rautia et al.

[11] 3,963,116

[45] June 15, 1976

[54] FEEDING SCREW FOR SLIDE CASTING MACHINE

[76] Inventors: Veli Matti Rautia, Kalamiehentie 8 C 21; Erkki Kalevi Asplund, Haukanmaki E 32, both of 04300 Hyryla, Finland

[22] Filed: June 10, 1975

[21] Appl. No.: 585,658

[30] Foreign Application Priority Data

June 25, 1974 Finland .............................. 1945/74

[52] U.S. Cl. ......................... 198/213; 198/220 BA; 259/9; 259/DIG. 24; 415/131; 417/900

[51] Int. Cl.$^{2}$ ........................................... B65G 33/00

[58] Field of Search ..................... 198/213, 220 BA; 415/72, 131; 417/900; 259/9, 10, DIG. 24, DIG. 41

[56] References Cited

UNITED STATES PATENTS

| | | | |
|---|---|---|---|
| 1,757,401 | 5/1930 | Thomas | 198/213 X |
| 3,023,455 | 3/1962 | Geier et al. | 259/9 X |
| 3,751,012 | 8/1973 | Michenko et al. | 259/DIG. 41 |
| 3,771,897 | 11/1973 | Braun | 417/900 |

*Primary Examiner*—Evon C. Blunk
*Assistant Examiner*—Douglas D. Watts

[57] ABSTRACT

A feeding screw for a slide casting machine. The feeding screw comprises a non-rotary, tubular inner part, a screw part, a vibrator arranged at the outer end of the inner part, and power transmission means for the vibrator. The mutual position of the inner part and the screw part can be changed by means of a tightening nut. Thereby the resiliency of an annular resilient means arranged in an annular space between the inner part and the screw part changes such that a desired distribution of vibration energy between an extended vibration portion of the screw and the screw itself is obtainable.

11 Claims, 3 Drawing Figures

FEEDING SCREW FOR SLIDE CASTING MACHINE

The present invention relates to a feeding screw for a slide casting machine, comprising:

a non-rotary tubular inner part with an widened outer end, a screw part arranged to rotate coaxially around the inner part, a vibrator arranged at the widened outer end of the inner part, power transmission means for the vibrator, arranged inside the tubular inner part.

The efficiency of vibration has become more important than ever in slide casting. Previously known feeding screws of the above type have in this sense some disadvantages. Thus, when the vibration takes place at the end of a relatively long feeding screw, it is impossible to use as big a vibration energy as otherwise would be desirable as the feeding screw might break at its base due to the stiff construction. On the other hand, the screw part itself ought to get at least some vibration energy in order to reduce the friction caused by the concrete. As far as the vibration is concerned, the vibrator itself ought to get the maximum energy. In previously known constructions these contradictory requirements have not been met.

It is the object of the invention to eliminate these disadvantages and to provide a feeding screw of a new type. The feeding screw for a slide casting machine according to the invention is mainly characterized by a resilient means arranged in an annular space between the inner part and the screw part, and tightening means with which the mutual axial position of the inner part and the screw part can be changed in order to change the resiliency of the resilient means.

Specific embodiments of the feeding screw according to the invention are defined in claims 2 to 8.

By means of the invention the advantage is gained that the vibrator can be operated with maximum energy, but the vibration energy can be divided between the vibrating part and the screw part in a desired adustable ratio.

The invention will be described in more detail in the following with reference to the embodiment according to the accompanying drawings.

Figure 1:
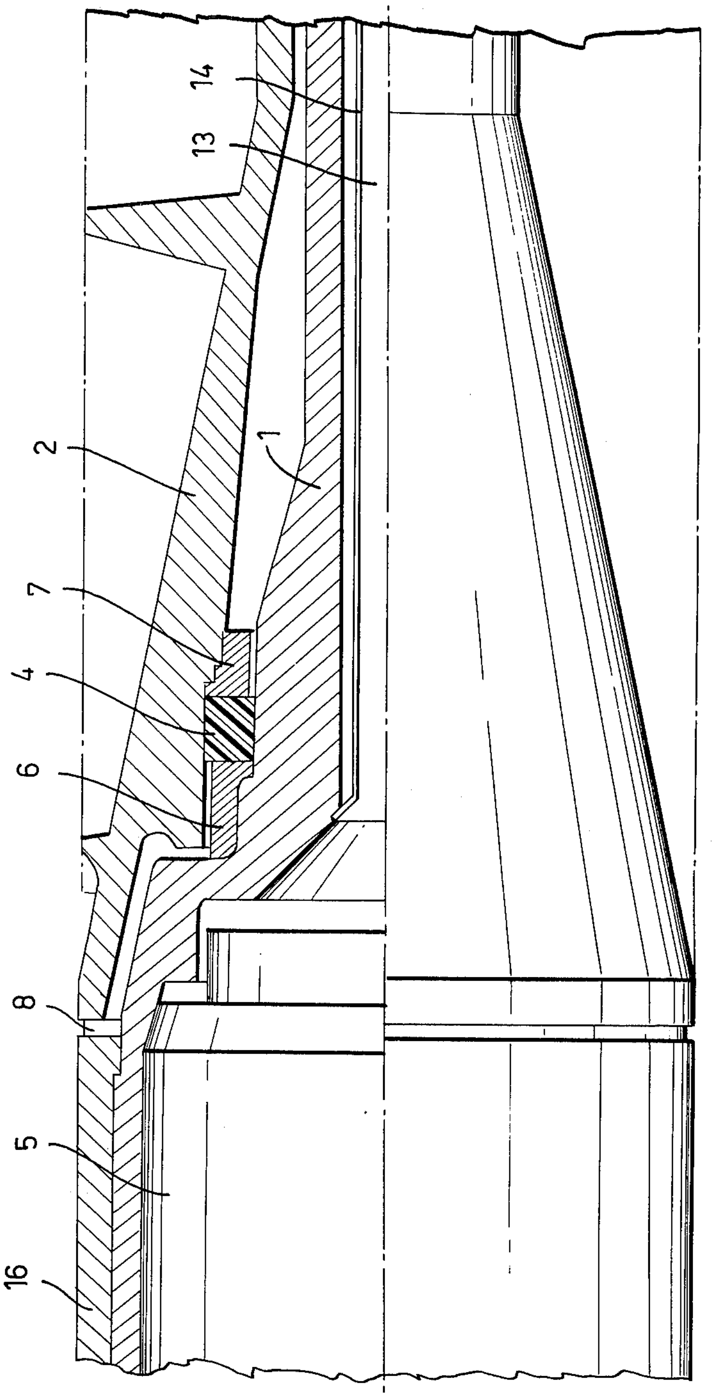
FIG. 1 is a partial cross-section of one arrangement between the inner part and the screw part in which a resilient means according to the invention is used.

The feeding screw according to the drawings comprises a non-rotary, tubular inner part 1 having a widened portion at the outer end where a vibrator 5 is arranged. Through a channel 13 extending through the inner part 1 are drawn the power transmission means 14 of the vibrator. In this embodiment they consist of electric cables of the electrically driven vibrator 5 but they can, in the case of a mechanical vibrator, consist of the axis of such a vibrator. A screw part 2 has been arranged to rotate coaxially around the inner part 1 so that the screw part 2 ends approximately at the same point where the widened portion of the inner part begins. The widened portion of the inner part 1 embracing the vibrator 5 is on the other hand encircled by a vibrator tube 16 which is packed against the outer end of the rotating screw 2 with a packing ring 8. This prevents concrete from penetrating into the feeding screw. The vibrator tube 16 is, moreover, accompanied by an accompanying tube (not shown) which is connected with the vibration tube 16 with an extremely resilient packing.

Between the inner part 1 and the screw part 2 there is an annular space in which a resilient means 4 is arranged. In this embodiment the resilient means consists of a ring of rectangular cross-section and manufactured, e.g. of rubber, neoprene, or plastic. This reslient means 4 can, of course, be of another cross-sectional shape, e.g., quadratic or circular. Said annular space is formed by a first ring piece 6 arranged around the inner part 1 and a second ring piece 7 arranged inside the screw part 2, said ring pieces following the contour of the resilient ring 4. The ring pieces 6 and 7 are made of some hard material, such as bronze, brass or steel. The resilient means 4 can also be divided into several portions, consisting, e.g., of two or more curved elements or pieces arranged in said annular space.

Figure 2:
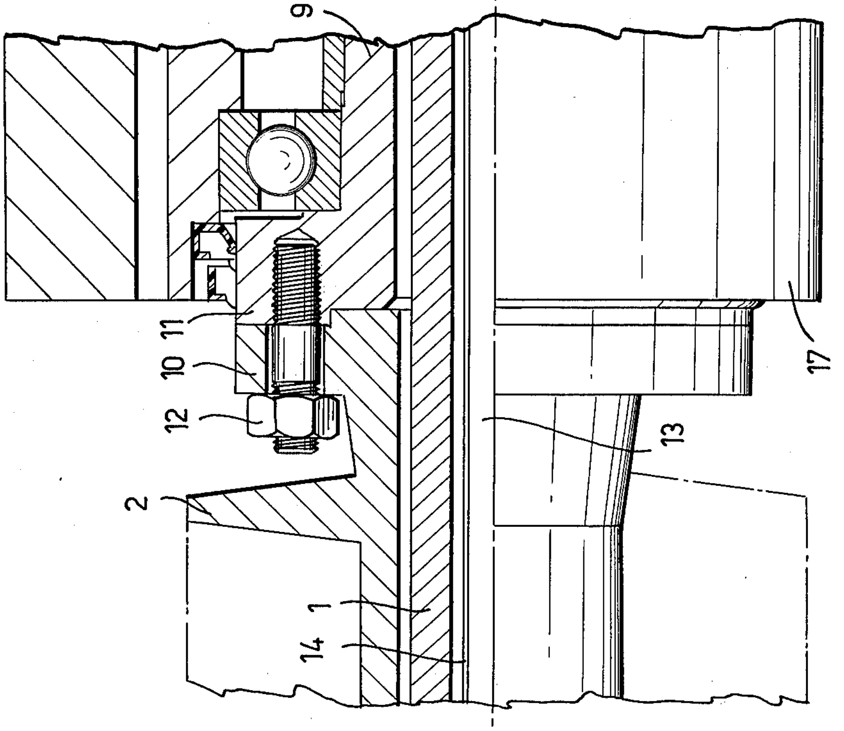
FIG. 2 is a partial cross-section showing the fastening of the screw part to the operating means.

From FIG. 2 appears how the screw part 2 is at its flange 10 fastened with a bolt fastening 12 to a corresponding flange 11 belonging to the drive means 17 of the screw.

Figure 3:
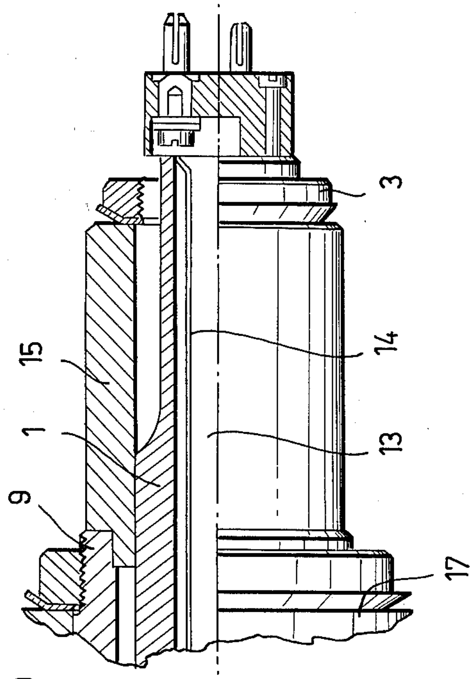
FIG. 3 is a partial cross-section of the arrangement of the tightening means at the inner end of the feeding screw.

From FIG. 3 appears how, when tightening the tightening means (in the present case a nut 3), the inner part 1 is drawn outward from an encircling tube part 15. Then the tube part 15 presses against a second screw part 9 in the operating means 17, which screw part again presses through the flange 11 axially against the flange 10 of the screw part 2 so that the annular space where the resilient means 4 is located tends to diminish and in this way to compress the annular means axially.

In this way it is possible, by tightening or by releasing the tightening means 3, to achieve a desired distribution of the vibration energy between the vibration portion and the screw portion of the feeding screw, e.g., so that the vibrator receives 80% and the screw part 20% of the vibration energy. When the tightening means are sufficiently tightened, it is possible to eliminate the resilience of the resilient means entirely and the screw becomes stiff.

As can be seen from the drawings, the inner part 1 and the screw part 2 are joined in relation to each other with a two-point fastening so that the resilient means 4 serves as one fastening point and the tightening means at the inner end of the screw serves as the other fastening point.

What we claim is:

1. A feeding screw for a slide casting machine. comprising:

a non-rotary, tubular inner part with a widened outer end;

a screw part arranged to rotate coaxially around the inner part;

a vibrator arranged at the widened outer end of the inner part;

power transmission means for the vibrator, arranged inside the tubular inner part;

a reslient means arranged in an annular space between the inner part and the screw part; and tightening means with which the mutual axial position of the inner part and the screw part can be changed in order to change the resiliency of the resilient means.

2. A feeding screw as claimed in claim 1, wherein said annular space is formed by a first ring piece arranged around the inner part and by a second ring piece arranged inside the screw part.

3. A feeding screw as claimed in claim 2, wherein said ring pieces are made of relatively hard material.

4. A feeding screw as claimed in claim 3, wherein said material is selected from the group consisting of bronze, brass and steel.

5. A feeding screw as claimed in claim 1, wherein the resilient means is annular.

6. A feeding screw as claimed in claim 1, wherein the resilient means consists of at least two curved elements.

7. A feeding screw as claimed in claim 1, wherein the resilient means is made of a material selected from the group consisting of rubber, neoprene, and plastic.

8. A feeding screw as claimed in claim 1, wherein the tightening means comprise a tightening nut at the inner end of the screw, by tightening of which nut the inner part can be drawn outward in relation to the rotating parts of the screw.

9. A feeding screw as claimed in claim 5, wherein the cross-section of the resilient means is rectangular.

10. A feeding screw as claimed in claim 5, wherein the cross-section of the resilient means is quadratic.

11. A feeding screw as claimed in claim 5, wherein the cross-section of the resilient means is circular.

* * * * *